3,396,012
RECOVERY OF SILICON FROM ALLOYS THEREOF
AND FROM SILICON SULFIDES
James O. Huml, Midland, Mich., assignor to The Dow Chemical Company, Midland, Mich., a corporation of Delaware
No Drawing. Filed Oct. 4, 1965, Ser. No. 492,924
20 Claims. (Cl. 75—62)

This invention relates to a process for the recovery of silicon from silicon sulfides and is more particularly related to a process for the preparation of silicon metal and alloys thereof by the reaction of silicon sulfides with sulfide-forming metals at elevated temperatures.

It is an object of this invention to provide a process for the recovery of silicon from silicon sulfides. It is a further object of this invention to provide a process for the preparation of silicon and silicon alloys by the reaction of a silicon sulfide with a sulfide-forming metal. These and other objects and advantages of the process will be readily appreciated and better understood by reference to the following detailed description.

It has now been discovered that silicon metal can be produced from silicon sulfides by reacting silicon sulfides with sulfide-forming metals other than silicon. At the completion of the reaction, the silicon metal forms a distinct phase which is insoluble in the metal sulfide phase. The metallic silicon phase may then be removed as a silicon metal product. The metal sulfide phase may be recovered as the sulfide or may be further treated to recover the metal therefrom.

By the term "sulfide-forming" metal is meant any metal which will react with SiS or $SiS_2$ at elevated temperatures to form a stable sulfide. This includes such metals as iron, aluminum, calcium, magnesium, cobalt, nickel, zinc, cadmium, manganese, titanium, vanadium, and the like and includes alloys or mixtures of such metals. Alloys of silicon with iron and aluminum are common and available in large quantities, and the process of this invention has been found useful in separating silicon from such alloys while simultaneously recovering silicon from silicon sulfides.

The silicon sulfide-containing starting material may be $SiS_2$, gaseous SiS, or the solid equimolar mixture of $SiS_2$ and Si which results from the disproportionation of Sis when it is cooled. In all instances, however, at reaction temperature, and in contact with a sulfide-forming metal the silicon sulfides are thought to exist as SiS. Silicon sulfide is generally employed in an amount at least as great as the stoichiomertic amount required to react with the metals other than silicon which are present to form the sulfides thereof. The stoichiometric reaction for aluminum may be illustrated as follows:

$$2Al + 3SiS \rightarrow Al_2S_3 + 3Si$$

The stoichiometric reaction for an alloy of aluminum and silicon may be illustrated as follows:

$$2Al-Si + 3SiS \rightarrow Al_2S_3 + 5Si$$

Less than a stoichiometric quantity of SiS would leave a proportionately higher concentration of the other alloyed metal or metals in the molten silicon product. A quantity of SiS substantially greater than stoichiometric would not be detrimental to the recovery of a purified silicon product but no particular advantage is gained by the addition of such excess. If the solid mixture of $SiS_2$ and Si is employed, it may be added to the alloy prior to or during heating. Since it is believed that the silicon source is present as SiS at reaction temperature, the silicon source is usually referred to herein as an SiS even though it is recognized that the $SiS_2$-Si disproportionation product or $SiS_2$ may be used to obtain the same results.

A reaction temperature is employed which is between the melting point of the sulfide-forming metal and the temperature of volatilization of the lowest boiling metal sulfide produced by the reaction (other than SiS). At atmospheric pressure, a temperature of between about 600° C. and 1600° C. is generally satisfactory. Neither increased nor reduced pressure are necessary to the efficient operation of this process, nor are they detrimental. Atmospheric pressure is convenient and is therefore usually preferred.

Reaction between the SiS and the metal or metal alloy is generally very rapid at the temperatures employed. Therefore, contact times of ½ hour to 2 hours are generally sufficient for accomplishing the reaction.

In the operation of this process, the sulfide-forming metal or alloy or mixture of metals is heated to the desired temperature of reaction by some suitable means, e.g. by placing a crucible containing such metal, alloy or mixture in a furnace or by the use of other known heating methods such as resistance or induction heating. As most metals are subject to oxidation at elevated temperatures, it is desirable that the process be conducted in a chemically inert atmosphere. Once reaction temperature is reached, the silicon sulfide-containing starting material is admixed with the molten alloy.

Alternatively, the silicon sulfide may be first mixed with the sulfide-forming metal and charged to the furnace as an intimate admixture. Such mixture may be charged into a furnace which subsequently heated to reaction temperature or may be charged to a furnace which was preheated to reaction temperature. The reaction of the SiS with the metal or metals other than silicon produces the sulfide of such other metals. The metal sulfide product and the silicon form distinct phases which may be separated by any suitable means. If the silicon product is not of the desired purity, it may be again treated with SiS and separated or may be purified by conventional methods such as zone refining. By employing one or more such treating cycles a silicon product is obtained which may contain as little as 50% silicon in the case of a single cycle to a product containing >99.9% silicon when multiple cycles are employed.

The following examples are set forth to illustrate the invention, but are not to be construed as limiting the scope thereof.

Example 1

A 16.2 gram sample of aluminum ingot was placed in a graphite crucible together with 24 grams of a 1:1 molar mixture of $SiS_2+Si$. The crucible was heated in an electric furnace having an argon atmosphere to a reaction temperature of 1500° C. for ½ hour. Two immiscible layers were formed. Analysis of the layers showed the following:

Silicon phase:
| Al | wt. percent | 2.1 |
| Fe | p.p.m. | 150 |
| Si | | Bal. |

Slag phase: wt. percent
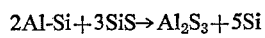
| Al | 35 |
| Si (disposed as flakes) | 1.5 |
| Fe | 0.02 |
| Sulphur | Bal. |

Example 2

A 40 gram sample of an alloy containing 44.5 weight percent Si, 16.5 weight percent Fe, 32.5 weight percent Al, 5.5 weight percent Ti and 1 weight percent Mn was reacted with 60 grams of an equimolar mixture of $SiS_2+Si$ at 1400° C. for 1 hour following the procedure of Example 1. The silicon phase occurred as discrete spheres intermixed with a metal sulfide slag. Analysis of the silicon phase showed it to contain 87 weight percent silicon, 10 weight percent Fe, 0.5 weight percent Al, 2.2 weight percent Ti and 0.3 weight percent Mn.

Various modifications can be made in the present invention without departing from the spirit or scope thereof, for it is understood that I limit myself only as defined in the appended claims.

I claim:

1. A process for the preparation of silicon metal from silicon sulfide which comprises contacting a silicon sulfide with a sulfide-forming metal other than silicon in an inert atmosphere and at a temperature between the melting point of such other metal and the boiling point of the lowest boiling metal sulfide product other than silicon sulfide to produce a silicon phase and a metal sulfide phase.

2. The process of claim 1 wherein the silicon sulfide is gaseous SiS.

3. The process of claim 1 wherein the silicon sulfide in an equimolar mixture of Si and $SiS_2$.

4. The process of claim 1 wherein the silicon sulfide is $SiS_2$.

5. A process for the preparation of silicon metal from silicon sulfide which comprises contacting a silicon sulfide with aluminum in an inert atmosphere at a temperature between the melting point of aluminum and the boiling point of $Al_2S_3$ to produce a silicon phase and an aluminum sulfide phase and separating the silicon phase therefrom.

6. The process of claim 5 wherein the silicon sulfide is gaseous SiS.

7. The process of claim 5 wherein the silicon sulfide in an equimolar mixture of Si and $SiS_2$.

8. The process of claim 5 wherein the silicon sulfide is $SiS_2$.

9. A process for the preparation of silicon from silicon sulfides which comprises heating an aluminum-containing alloy to a temperature between the melting point thereof and the boiling point of the lowest boiling metal sulfide product thereof other than silicon sulfide with a silicon sulfide to produce a silicon phase and a metal sulfide phase and separating the silicon phase therefrom.

10. The process of claim 9 wherein the silicon sulfide is gaseous SiS.

11. The process of claim 9 wherein the silicon sulfide is an equimolar mixture of Si and $SiS_2$.

12. The process of claim 9 wherein the silicon sulfide is $SiS_2$.

13. A process for removing silicon from alloys thereof with sulfide-forming metals other than silicon which comprises contacting in an inert atmosphere such sulfide-forming metal with sufficient silicon sulfide to react with the sulfide-forming metal at a temperature between the melting point of such alloy and the boiling point of the lowest boiling metal sulfide product therefrom other than silicon sulfide to produce a silicon metal phase and a metal sulfide phase and separating the silicon phase therefrom.

14. The process of claim 13 wherein the silicon sulfide is gaseous SiS.

15. The process of claim 13 wherein the silicon sulfide is an equimolar mixture of SiS and $SiS_2$.

16. The process of claim 13 wherein the silicon sulfide is $SiS_2$.

17. A process for the preparation of alloys of silicon which comprises contacting in an inert atmosphere at least one sulfide-forming metal other than silicon with a quantity of a silicon sulfide insufficient to react with the sulfide forming metal at a temperature above the melting point of the sulfide-forming metal and below the boiling point of the lowest boiling metal sulfide product other than silicon sulfide to produce a silicon-metal alloy phase and a metal sulfide phase, and separating the alloy phase from the metal sulfide phase.

18. The process of claim 17 wherein the silicon sulfide is gaseous SiS.

19. The process of claim 17 wherein the silicon sulfide is an equimolar mixture of Sis and $SiS_2$.

20. The process of claim 17 wherein the silicon sulfide is $SiS_2$.

References Cited

UNITED STATES PATENTS

| | | | |
|---|---|---|---|
| 602,632 | 4/1898 | DeChalmot | 23—223.5 |
| 876,313 | 1/1908 | Becket | 75—135 X |
| 1,238,279 | 8/1917 | Dwight | 75—89 |
| 1,849,476 | 3/1932 | Brace | 75—129 X |
| 1,982,959 | 12/1934 | Kuhlmann | 75—63 |
| 2,301,360 | 11/1942 | Brennan | 75—63 X |
| 2,844,441 | 7/1958 | Pellin | 23—223.5 X |

OTHER REFERENCES

Wartenberg: Article in Z. anorg. u. allgem. Chem., vol. 286, September 1956, pp. 247–253.

HYLAND BIZOT, *Primary Examiner.*

H. W. TARRING, *Assistant Examiner.*